(12) United States Patent
Hochstetler et al.

(10) Patent No.: US 10,533,499 B2
(45) Date of Patent: Jan. 14, 2020

(54) SEAL PLATE LOCATED BETWEEN TWO HOUSING PORTIONS IN AN INTEGRATED DRIVE GENERATOR

(71) Applicant: HAMILTON SUNDSTRAND CORPORATION, Charlotte, NC (US)

(72) Inventors: Derek R. Hochstetler, Rockford, IL (US); Ted A. Martin, Byron, IL (US); Duane C. Johnson, Beloit, WI (US); Glenn C. Lemmers, Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 106 days.

(21) Appl. No.: 15/723,495

(22) Filed: Oct. 3, 2017

(65) Prior Publication Data

US 2019/0101059 A1  Apr. 4, 2019

(51) Int. Cl.
| | | |
|---|---|---|
| *F02C 7/32* | (2006.01) | |
| *F16J 15/08* | (2006.01) | |
| *F02C 7/28* | (2006.01) | |

(52) U.S. Cl.
CPC ............. *F02C 7/32* (2013.01); *F16J 15/0818* (2013.01); *F02C 7/28* (2013.01); *F16J 2015/0868* (2013.01)

(58) Field of Classification Search
CPC .... F16J 15/061; F16J 15/0818; F16J 15/0831; F16J 15/0868; F01D 25/183; F02C 7/28; F02C 7/32
See application file for complete search history.

(56) References Cited

U.S. PATENT DOCUMENTS

| 6,173,966 B1 | 1/2001 | Noble et al. | |
|---|---|---|---|
| 6,367,248 B1* | 4/2002 | Langston | F15B 1/26 60/413 |
| 6,418,714 B1* | 7/2002 | Johnson | B64D 41/00 244/58 |
| 8,316,880 B2* | 11/2012 | Grosskopf | F16K 17/044 137/504 |
| 8,449,431 B2* | 5/2013 | Goi | F02C 7/32 476/33 |
| 8,454,326 B2* | 6/2013 | Grosskopf | F16C 17/22 384/297 |

(Continued)

FOREIGN PATENT DOCUMENTS

WO  2015/006479 A1  1/2015

OTHER PUBLICATIONS

European Search Report for EP Application No. 18197716.6 dated Mar. 27, 2019.

*Primary Examiner* — Nicholas L Foster
(74) *Attorney, Agent, or Firm* — Carlson, Gaskey & Olds, P.C.

(57) ABSTRACT

A seal plate body has a first the zone including three bolt hole ears and an oil passage ear. A second zone includes four bolt hole ears. A third zone includes six bolt ears and one alignment pin ear. A fourth zone has three bolt hole ears. A fifth zone includes five bolt hole ears and one oil passage ear. A sixth zone includes three bolt hole ears and one alignment pin ear. Each of the bolt hole ears includes a bolt hole, and each of the oil passage ears includes an oil passage hole. An integrated drive generator and a method are also disclosed.

20 Claims, 3 Drawing Sheets

(56) References Cited

U.S. PATENT DOCUMENTS

| | | | |
|---|---|---|---|
| 9,006,942 B2 * | 4/2015 | Lemmers, Jr. | H02K 1/185 310/54 |
| 9,115,794 B2 * | 8/2015 | Vanderzyden | F16H 39/12 |
| 9,523,385 B2 * | 12/2016 | Grosskopf | F16C 17/22 |
| 9,759,305 B2 * | 9/2017 | Lemmers, Jr. | F16H 55/08 |
| 9,890,839 B2 * | 2/2018 | Goi | F02C 7/32 |
| 2010/0200692 A1 * | 8/2010 | Goi | F02C 7/32 244/58 |
| 2010/0283334 A1 * | 11/2010 | Lemmers, Jr. | H02K 1/185 310/54 |
| 2010/0283338 A1 * | 11/2010 | Grosskopf | F16K 17/044 310/66 |
| 2010/0284836 A1 * | 11/2010 | Grosskopf | F16C 17/22 417/410.1 |
| 2011/0072634 A1 | 3/2011 | Kamibayashiyama | |
| 2013/0221785 A1 * | 8/2013 | Grosskopf | F16C 17/22 310/90 |
| 2014/0009126 A1 * | 1/2014 | Vanderzyden | F16H 39/12 322/40 |
| 2014/0038770 A1 * | 2/2014 | Goi | F02C 7/32 476/8 |

* cited by examiner

SEAL PLATE LOCATED BETWEEN TWO HOUSING PORTIONS IN AN INTEGRATED DRIVE GENERATOR

BACKGROUND OF THE INVENTION

This application relates to a seal plate positioned between two housing portions in an integrated drive generator.

Integrated drive generators are known and often utilized in aircraft. As known, a gas turbine engine on the aircraft provides a drive input into a generator input shaft. The generator typically includes a disconnect shaft that can transmit the input into a gear differential. The gear differential selectively drives a main generator to provide electric power for various uses on the aircraft.

It is desirable that the generated power be of a desired constant frequency. However, the speed from the input shaft will vary during operation of the gas turbine engine. This would result in variable frequency.

Integrated drive generators are provided with speed trimming hydraulic units. Gears associated with the differential and, in particular, a ring gear portion, provide rotation from the differential back into the trimming unit. A carrier also rotates another portion of the trimming unit. The trimming unit is operable to result in the output speed of the differential being effectively constant, such that electric power of a desirable frequency is generated.

The generator is mounted between two housing portions and a seal plate is mounted between the two housing portions.

In addition, various accessory systems, such as various pumps, are driven by the carrier of the differential through an accessory drive gear.

As can be appreciated, an integrated drive generator must be fully sealed. There are design challenges for the seal plate.

SUMMARY OF THE INVENTION

A seal plate body has a first the zone including three bolt hole ears and an oil passage ear. A second zone includes four bolt hole ears. A third zone includes six bolt ears and one alignment pin hole ear. A fourth zone has three bolt hole ears. A fifth zone includes five bolt hole ears and one oil passage ear. A sixth zone includes three bolt hole ears and one bolt hole ear. Each of the bolt hole ears include a bolt hole, and each of the oil passage ears include an oil passage hole. An integrated drive generator and a method are also disclosed.

These and other features may be best understood from the following drawings and specification.

DETAILED DESCRIPTION

Figure 1:
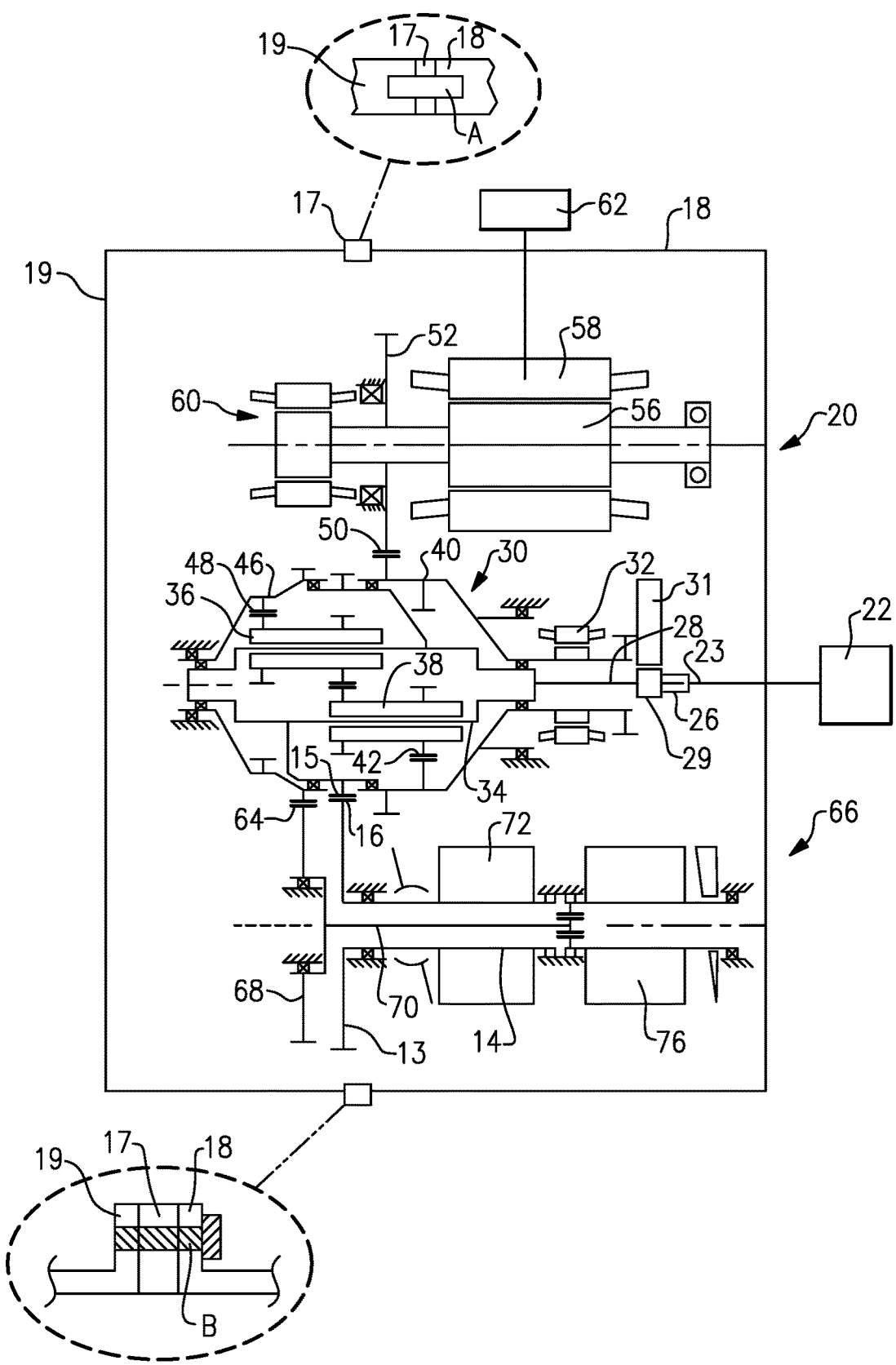
FIG. 1 schematically shows an integrated drive generator.

FIG. 1 shows an integrated drive generator 20. As shown, housing portions 18 and 19 surround the integrated drive generator and a seal plate 17 sits between the housing portions 18 and 19. The seal plate 17 seals oil within the housing. As shown schematically, at certain locations, bolts B and alignment pins A extend through holes in the seal plate to secure and align housing portions 18/19.

A gas turbine engine 22 may drive an input shaft 23 which selectively drives a disconnect assembly 26. The disconnect assembly 26, in turn, drives a carrier shaft 28, which drives a carrier in a gear differential 30.

As the carrier shaft 28 rotates, planet gears 36 and 38 are caused to rotate. Gears 38 have a gear interface 42 with a first ring gear portion 40. Gears 36 have a gear interface 48 with a second ring gear portion 46.

Ring gear portion 40 has a gear interface 50 with a main generator drive gear 52. When drive gear 52 is driven to rotate, it rotates a rotor 56 associated with a stator 58 of the main generator as well as an exciter rotor 60. Electric power is generated for a use 62, as known.

It is desirable that the frequency of the generated electric power be at a desired frequency. This requires the input speed to gear 52 to be relatively constant and at the desired speed. As such, the speed of the input shaft 23 is added to the speed of the speed trimmer 66 to result in a constant input speed to gear 52.

A gear 15 that is part of the carrier has a gear interface 16 with a gear 13 driving a shaft 14 also within the speed trimmer.

As known, the speed trimmer 66 includes a variable unit 72 and a fixed unit 76. The units 72 and 76 may each be provided with a plurality of pistons and a swash plate arrangement. If the input speed of the gear 13 is too high, the speed of the gear 52 will also be too high, and hence, the speed trimmer 66 acts to lower the speed of the trim gear 46 which will drop the speed of gear 52. On the other hand, if the input speed is too low, the speed trimmer will increase the trim gear speed and the speed seen by gear 52 will increase.

In essence, the variable unit 72 receives an input through gear 13 that is proportional to the speed of the input shaft 23. The variable unit 72 also receives a control input from a control monitoring the speed of the generator rotor 56. The position of the swash plate in the variable unit 72 is changed to in turn change the speed and direction of the fixed unit 76. The fixed unit 76 can change the speed, and direction of rotation of the shaft 70, and this then provides control back through the trim ring gear 46 to change the speed reaching the generator. In this manner, the speed trimmer 66 results in the frequency generated by the generator being closer to constant, and at the desired frequency.

A permanent magnet generator 32 rotates with the ring gear 40.

An accessory drive shaft 29 rotates with the carrier shaft 28 and drives a plurality of accessory gears 31.

The operation of the integrated drive generator 20 is generally as known in the art. A worker of ordinary skill would recognize that the desired frequency and speed at use 62 would dictate a number of design functions.

Figure 2A:
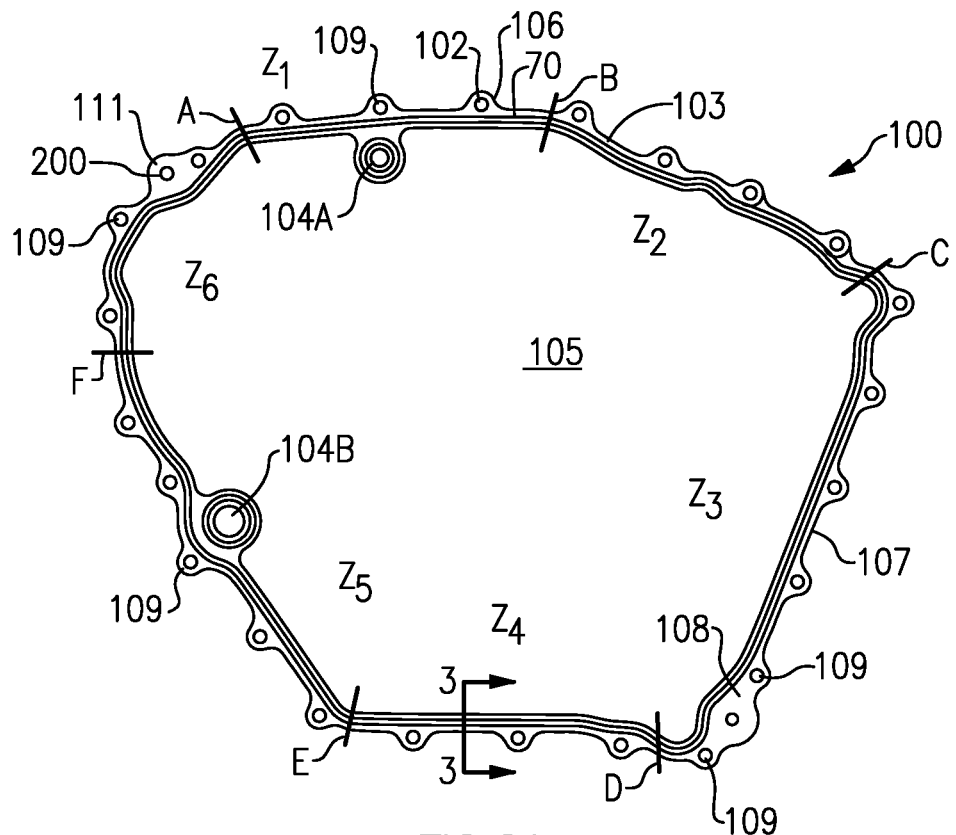
FIG. 2A shows a disclosed seal plate.

FIG. 2A shows a seal plate 100 which may be utilized at the location of the seal plate 17 of FIG. 1. Seal plate 100 includes a plurality of bolt hole ears 102 extending from an outer side of a seal plate body 103. Ears 102 contain bolt holes to receive bolts used to secure housings 18 and 19 together. Also, two alignment pin hole ears 200 are included. As can be appreciated, the seal plate body 103 surrounds an interior space 105 which will be within the housings. There are also oil passage ears 104 inward of the body 103 and within the space 105.

The oil passage ears 104A and 104B are formed at distinct locations.

The seal plate 100 can be defined as including six basic extending sides Z1-Z6. Z1 is defined between a point A and a point B. Z2 is defined between a point B and a point C. Z3 is defined between a point C and a point D. Z4 is defined between a point D and a point E. Z5 is defined between a point E and a point F. Z6 is defined between a point F and point A.

The zone Z1 includes three bolt hole ears 102 and the oil passage ear 104A. As can be appreciated, none of the zones Z1-Z6 extend exactly straight, however, the directions of the zone Z1-Z6 are all generally straight. The Z1 zone extends along a first direction towards zone Z2.

Zone Z2 extends at an angle in a second direction away from Z1 and towards Z3. The zone Z2 includes four bolt hole ears.

The zone Z3 could be said to extend back in a direction having a component opposed to the first direction towards Z4. The zone Z3 includes six bolt hole ears and one alignment pin hole ear 200.

The zone Z4 could be seen to extend in a direction from the end of the zone Z3 towards Z5. The Z4 zone includes three bolt hole ears.

The zone Z5 can be seen to extend further in a direction having a component opposed to the first direction, but also back toward the first zone Z1. The zone Z5 includes five bolt hole ears and one oil passage ear 104B.

The zone Z6 can be seen to extend with a component in the first direction and back to connect to an end of the first zone Z1. Z6 includes three bolt hole ears and one alignment pin hole ear 200.

Notably, one bolt hole ear 109 is positioned on an opposed side of the body 103 from both oil passage ears 104A and 104B.

In an embodiment, there are thus 24 bolt holes and two alignment pin holes.

As also shown, a group of ears 108 in zone three actually includes two bolt hole ears 109 and one alignment pin ear 200. Others of the bolt hole ears generally have a thinner section 107 separating the bolt hole ears from the most adjacent bolt hole ear, and each of the bolt hole ears 102 including a single bolt hole. A second group of ears 111 includes two bolt hole ears 105 and an alignment pin hole ear 200, and is in zone six.

Figure 2B:
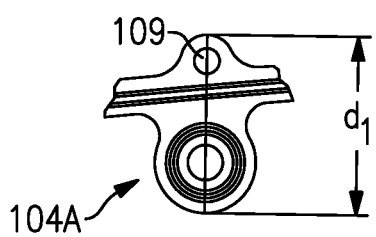
FIG. 2B shows a first detail.

FIG. 2B illustrates details of the oil return ear 104A. A distance between a line that bisects the bolt hole ear 109 and the oil passage ear 104A and between the furthest spaced surfaces is defined as $d_1$. In one embodiment, $d_1$ was between 1.8 and 2.2. A diameter of the oil passage hole in oil return ear 104A was 0.406 inch (1.03 cm). A diameter of all the bolt holes in the bolt hole ears 102/109 was 0.281 inch (0.71 cm).

Figure 2C:
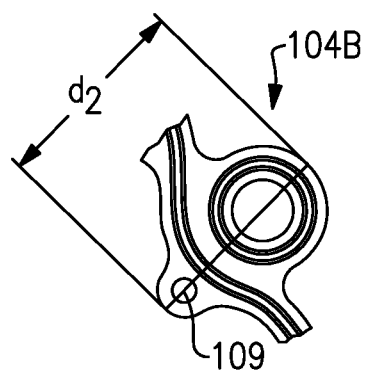
FIG. 2C shows a second detail.

As shown in FIG. 2C, a diameter of the oil passage ear 104B was 0.710 inch (1.8 cm). A distance $d_2$ between the outer surface of the bolt hole ear 109 and the oil return ear 104B is defined as $d_2$. In one embodiment, $d_2$ was between 2.1 and 2.5.

Figure 2D:
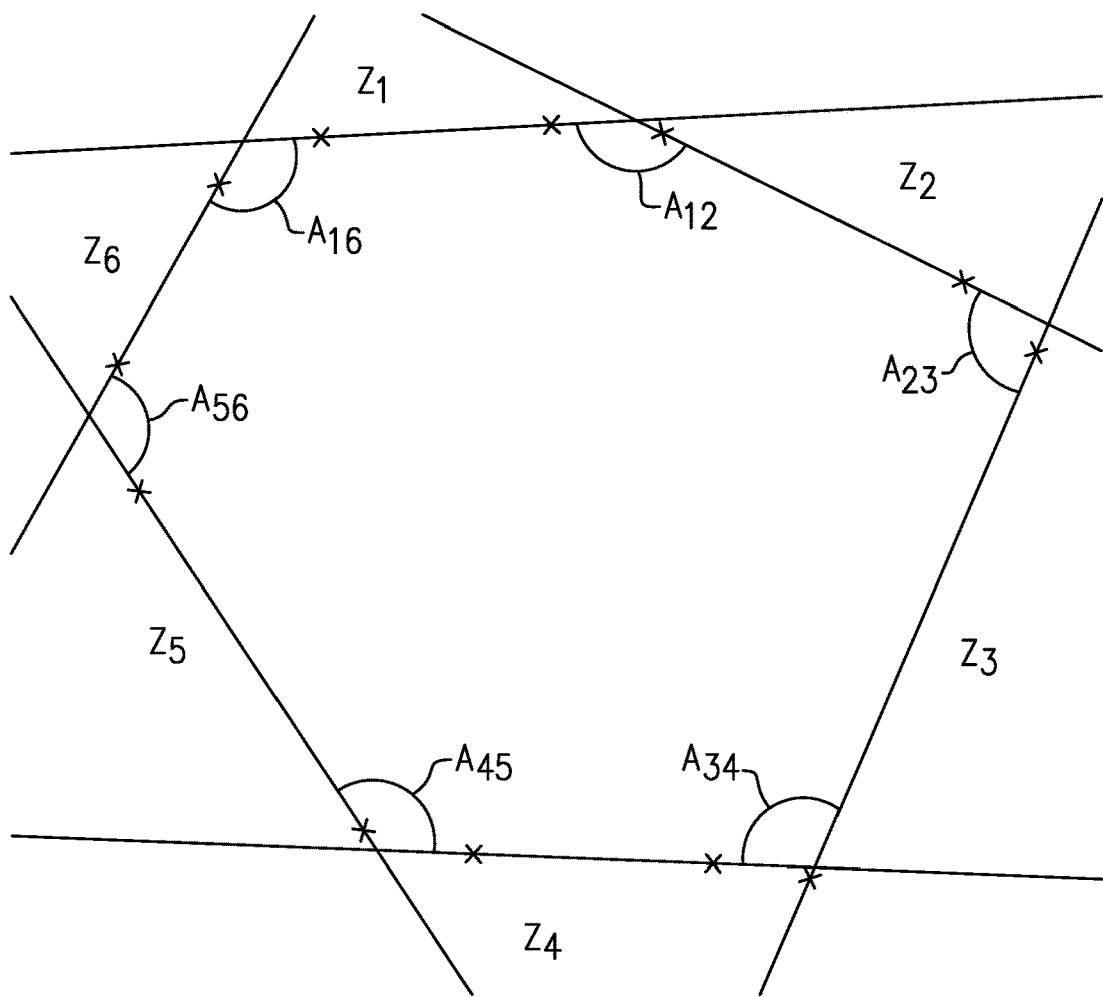
FIG. 2D shows another aspect.

FIG. 2D shows geometric relationship across the six zones or sides Z1-Z6. If a line is drawn bisecting the outermost bolt holes at the outermost extents of each zones Z1-Z6, those lines would intersect as shown in FIG. 2D.

There are interior included angles between the intersecting lines. An included angle $A_{16}$ in one embodiment was 145° and in embodiments was between 135 and 155°. Included angle $A_{11}$ in one embodiment was 150°, and in embodiments between 140 and 160°. Included angles $A_{23}$ in one embodiment was 95°, and in embodiments is between 85 and 105°. Included angle $A_{34}$ in one embodiment was 115°, and is embodiments is between 105 and 125°. Included angle $A_{45}$ in one embodiment was 125°, and is embodiments is between 115 and 135°. Included angle $A_{56}$ in one embodiment was 160°, and is embodiments is between 90 and 110°. The approximate location of the outermost bolt holes utilized to define each of the lines is shown by an X in FIG. 2D. It should be understood that the lines illustrated may extend to intersect other lines outside the seal plate body 103.

Figure 3:
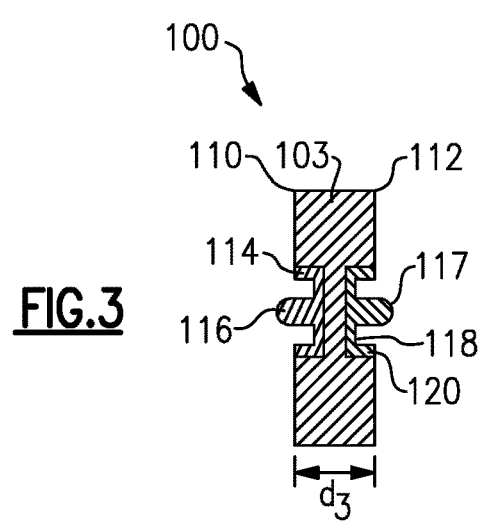
FIG. 3 is a cross-sectional view through line 3-3.

FIG. 3 is a cross-sectional view along line 3-3. As shown, the body 103 extends between ends 110 and 112. A third distance $d_3$, which may be called a thickness, is defined between the ends 110 and 112. In an embodiment, $d_3$ was 0.125 inch (0.32 cm).

In embodiments, a ratio of $d_1$ to $d_3$ was between 14.4 and 17.6. A ratio of $d_2$ to $d_3$ is between 16.8 and 20.0. A ratio of the diameter of the oil passage hole in the ear 104B to $d_3$ is between 5.5 and 5.9. A ratio of the diameter of the oil passage hole in ear 104A to the distance $d_3$ is between 3.1 and 3.5. A ratio of the diameter of the bolt holes in the bolt hole ears 102/109 to the distance $d_3$ is between 2.0 and 2.5.

As further shown, there is a central channel 114 formed in the body 103 and a sealing gasket 106 is formed in the cavity 114 and has a central enlarged nub 117 spaced by nub ditches 118 and outer extending areas 120.

In one embodiment, the body 103 was formed of aluminum and the gasket 116 was formed of an elastomer.

The seal plate body 103 could be said to include a thinner portion at channel 114, and receives a seal member 116 having outwardly extending nub 117. There are seal members 116 on two opposed sides of the seal plate body 103, and extending along each of the six sides of the seal plate body 103 with the nubs having outer surfaces spaced by each from each other by a distance that is greater than the thickness $d_3$ of the seal plate body.

A method of replacing a seal plate in an integrated drive generator comprises the steps of removing an existing seal plate from an integrated drive generator. The generator has an input shaft for driving a differential, and the differential is connected for driving a generator rotor. A housing surrounds the integrated drive generator, and includes two housing portions. The existing seal plate is positioned between the two housing portions. The two housing portions are secured with a plurality of bolts.

The method includes the further step of replacing the existing seal plate with a replacement seal plate. The replacement seal plate may be as disclosed herein.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A seal plate for use in an integrated drive generator comprising:
   a seal plate body having six zones, all of the zones are generally straight but not entirely straight;
   a first of the zones includes three bolt hole ears and an oil passage ear, the first zone extends along a first direction towards a second of the zones;
   the second zone extends at an angle in a second direction away from the first zone, the second direction having a component extending in an opposite direction relative to the first direction, and towards a third of the zones, the second zone includes four bolt hole ears;

the third zone extends in a direction having a component opposed to the first direction towards a fourth of the zones, the third zone includes six bolt hole ears and one alignment pin ear;

the fourth zone extends from an end of the third zone towards a fifth of the zones, the fourth zone includes three bolt hole ears;

the fifth zone extends in a direction with a component in the second direction, and also with a component back toward the first zone, the fifth zone includes five bolt hole ears and one oil passage ear;

a sixth zone extends from an end of the fifth zone in a direction with a component in the first direction and back to connect to an end of the first zone, the sixth zone includes three bolt hole ears and one alignment pin ear; and each of the bolt hole ears including a bolt hole, and each of the oil passage ears including an oil passage hole.

2. The seal plate as set forth in claim 1, wherein one of the bolt hole ears is aligned on an opposed side of the seal plate body from the oil passage ear in the fifth zone, and a first distance is defined from a first position on an outer surface of the fifth side aligned bolt hole ear to a second position on an inner surface of the oil passage ear in the fifth zone spaced furthest from the first position on a line bisecting both the bolt hole in the aligned bolt hole ear and the oil passage ear in the fifth zone, with a thickness of the seal plate body also being defined and a ratio of the first distance to the thickness being between 16.8 and 20.0.

3. The seal plate as set forth in claim 2, wherein one of the bolt hole ears is aligned on an opposed side of the seal plate body from the oil passage ear in the first zone, a second distance is defined from a first position on an outer surface of the first zone aligned bolt hole ear to a second position on an inner surface of the oil passage ear in the first zone spaced furthest from the first position on a line bisecting both the bolt hole in the aligned bolt hole and the oil passage ear in the first zone, and a ratio of the second distance to the thickness being between 14.4 and 17.6.

4. The seal plate as set forth in claim 3, wherein a corresponding line is defined for each of the zones drawn bisecting outermost of the bolt holes in one of the bolt hole ears at outermost extents of each the zones, the lines intersecting to define included angles facing an interior of the seal plate body, the included angle between the sixth and first zones is between 135 and 155°, the included angle between the first and second zones is between 140 and 160°, the included angle between the second and third zones is between 85 and 105°, the included angle between the third and fourth zones is between 105 and 125°, the included angle between the fourth and fifth zones is between 115 and 135°, and the included angle between the fifth and sixth zones is between 90 and 110°.

5. The seal plate as set forth in claim 4, wherein each of the bolt holes in the bolt hole ears defining a bolt hole diameter, and a ratio of the bolt hole diameter to the thickness being between 5.5 and 5.9, the oil passage hole in the first zone having a first zone oil passage hole diameter, and a ratio of the first oil passage hole diameter to the thickness being between 3.1 and 3.5, and the oil passage hole in the fifth zone having a fifth zone oil passage hole diameter, and a ratio of the fifth zone oil passage hole diameter to the thickness being between 2.0 and 2.5.

6. The seal plate as set forth in claim 1, wherein a corresponding line is defined for each of the zones drawn bisecting outermost of the bolt holes in one of the bolt hole ears at outermost extents of each the zones, the lines intersecting to define included angles facing an interior of the seal plate body, the included angle between the sixth and first zones is between 135 and 155°, the included angle between the first and second zones is between 140 and 160°, the included angle between the second and third zones is between 85 and 105°, the included angle between the third and fourth zones is between 105 and 125°, the included angle between the fourth and fifth zones is between 115 and 135°, and the included angle between the fifth and sixth zones is between 90 and 110°.

7. The seal plate as set forth in claim 1, wherein each of the bolt holes in the bolt hole ears defining a bolt hole diameter, and a ratio of the bolt hole diameter to the thickness being between 5.5 and 5.9, the oil passage hole in the first zone having a first zone oil passage hole diameter, and a ratio of the first oil passage hole diameter to a thickness of the seal plate body being between 3.1 and 3.5, and the oil passage hole in the fifth zone having a fifth zone oil passage hole diameter, and a ratio of the fifth zone oil passage hole diameter to the thickness being between 2.0 and 2.5.

8. An integrated drive generator comprising:

an input shaft for driving a differential, the differential connected for driving a generator rotor;

a housing including two housing portions, with a seal plate positioned between the two housing portions, the two housing portions secured with a plurality of bolts;

the seal plate having a seal plate body with six zones, all of the zones are generally straight but not entirely straight;

a first of the zones includes three bolt hole ears and an oil passage ear, the first zone extends along a first direction towards a second of the zones;

the second zone extends at an angle in a second direction away from the first zone, the second direction having a component extending in an opposite direction relative to the first direction, and towards a third of the zones, the second zone includes four bolt hole ears;

the third zone extends in a direction having a component opposed to the first direction towards a fourth of the zones, the third zone includes six bolt ears and one alignment pin ear;

the fourth zone extends from an end of the third zone towards a fifth of the zones, the fourth zone includes three bolt hole ears;

the fifth zone extends in a direction a with a component in the second direction, and also with a component back toward the first zone, the fifth zone includes five bolt hole ears and one oil passage ear;

a sixth zone extends from an end of the fifth zone in a direction with a component in the first direction and back to connect to an end of the first zone, the sixth zone includes three bolt hole ears and one alignment pin ear; and each of the bolt hole ears including a bolt hole receiving one of the plurality of bolts, and each of the oil passage ears including an oil passage hole.

9. The integrated drive generator as set forth in claim 8, wherein one of the bolt hole ears is aligned on an opposed side of the seal plate body from the oil passage ear in the fifth zone, and a first distance is defined from a first position on an outer surface of the fifth side aligned bolt hole ear to a second position on an inner surface of the oil passage ear in the fifth zone spaced furthest from the first position on a line bisecting both the bolt hole in the aligned bolt hole ear and the oil passage ear in the fifth zone, with a thickness of the seal plate body also being defined and a ratio of the first distance to the thickness being between 16.8 and 20.0.

10. The integrated drive generator as set forth in claim 9, wherein one of the bolt hole ears is aligned on an opposed side of the seal plate body from the oil passage ear in the first zone, a second distance is defined from a first position on an outer surface of the first zone aligned bolt hole ear to a second position on an inner surface of the oil passage ear in the first zone spaced furthest from the first position on a line bisecting both the bolt hole in the aligned bolt hole and the oil passage ear in the first zone, and a ratio of the second distance to the thickness being between 14.4 and 17.6.

11. The integrated drive generator as set forth in claim 10, wherein a corresponding line is defined for each the zones drawn bisecting outermost of the bolt holes in one of the bolt hole ears at outermost extents of each the zones, the lines intersecting to define included angles facing an interior of the seal plate body, the included angle between the sixth and first zones is between 135 and 155°, the included angle between the first and second zones is between 140 and 160°, the included angle between the second and third zones is between 85 and 105°, the included angle between the third and fourth zones is between 105 and 125°, the included angle between the fourth and fifth zones is between 115 and 135°, and the included angle between the fifth and sixth zones is between 90 and 110°.

12. The integrated drive generator as set forth in claim 11, wherein each of the bolt holes in the bolt hole ears defining a bolt hole diameter, and a ratio of the bolt hole diameter to the thickness being between 5.5 and 5.9, the oil passage hole in the first zone having a first zone oil passage hole diameter, and a ratio of the first oil passage hole diameter to the thickness being between 3.1 and 3.5, and the oil passage hole in the fifth zone having a fifth zone oil passage hole diameter, and a ratio of the fifth zone oil passage hole diameter to the thickness being between 2.0 and 2.5.

13. The integrated drive generator as set forth in claim 8, wherein a corresponding line is defined for each of the zones drawn bisecting outermost of the bolt holes in one of the bolt hole ears at outermost extents of each the zones, the lines intersecting to define included angles facing an interior of the seal plate body, the included angle between the sixth and first zones is between 135 and 155°, the included angle between the first and second zones is between 140 and 160°, the included angle between the second and third zones is between 85 and 105°, the included angle between the third and fourth zones is between 105 and 125°, the included angle between the fourth and fifth zones is between 115 and 135°, and the included angle between the fifth and sixth zones is between 90 and 110°.

14. The integrated drive generator as set forth in claim 8, wherein each of the bolt holes in the bolt hole ears defining a bolt hole diameter, and a ratio of the bolt hole diameter to the thickness being between 5.5 and 5.9, the oil passage hole in the first zone having a first zone oil passage hole diameter, and a ratio of the first oil passage hole diameter to a thickness of the seal plate body being between 3.1 and 3.5, and the oil passage hole in the fifth zone having a fifth zone oil passage hole diameter, and a ratio of the fifth zone oil passage hole diameter to the thickness being between 2.0 and 2.5.

15. A method of replacing a seal plate in an integrated drive generator comprising the steps of:

removing an existing seal plate from an integrated drive generator having an input shaft for driving a differential, the differential connected for driving a generator rotor, a housing surrounding the integrated drive generator, and including two housing portions, with the existing seal plate positioned between the two housing portions, and the two housing portions being secured with a plurality of bolts; and replacing the existing seal plate with a replacement seal plate, the replacement seal plate including a seal plate body having six zones, all of the zones are generally straight but not entirely straight, a first of the zones includes three bolt hole ears and an oil passage ear, the first zone extends along a first direction towards a second of the zones, the second zone extends at an angle in a second direction away from the first zone, the second direction having a component extending in an opposite direction relative to the first direction, and towards a third of the zones, the second zone includes four bolt hole ears, the third zone extends in a direction having a component opposed to the first direction towards a fourth of the zones, the third zone includes six bolt ears and one alignment pin ear, the fourth zone extends from an end of the third zone towards a fifth of the zones, the fourth zone includes three bolt hole ears, the fifth zone extends in a direction with a component in the second direction, and also with a component back toward the first zone, the fifth zone includes five bolt hole ears and one oil passage ear, a sixth zone extends from an end of the fifth zone in a direction with a component in the first direction and back to connect to an end of the first zone, the sixth zone includes three bolt hole ears and one alignment pin ear, and each of the bolt hole ears including a bolt hole, and each of the oil passage ears including an oil passage hole.

16. The method as set forth in claim 15, wherein one of the bolt hole ears is aligned on an opposed side of the seal plate body from the oil passage ear in the fifth zone, and a first distance is defined from a first position on an outer surface of the fifth side aligned bolt hole ear to a second position on an inner surface of the oil passage ear in the fifth zone spaced furthest from the first position on a line bisecting both the bolt hole in the aligned bolt hole ear and the oil passage ear in the fifth zone, with a thickness of the seal plate body also being defined and a ratio of the first distance to the thickness being between 16.8 and 20.0.

17. The method as set forth in claim 16, wherein one of the bolt hole ears is aligned on an opposed side of the seal plate body from the oil passage ear in the first zone, a second distance is defined from a first position on an outer surface of the first zone aligned bolt hole ear to a second position on an inner surface of the oil passage ear in the first zone spaced furthest from the first position on a line bisecting both the bolt hole in the aligned bolt hole and the oil passage ear in the first zone, and a ratio of the second distance to the thickness being between 14.4 and 17.6.

18. The method as set forth in claim 17, wherein a corresponding line is defined for each of the zones drawn bisecting outermost of the bolt holes in one of the bolt hole ears at outermost extents of each the zones, the lines intersecting to define included angles facing an interior of the seal plate body, the included angle between the sixth and first zones is between 135 and 155°, the included angle between the first and second zones is between 140 and 160°, the included angle between the second and third zones is between 85 and 105°, the included angle between the third and fourth zones is between 105 and 125°, the included angle between the fourth and fifth zones between 115 and 135°, and the included angle between the fifth and sixth zones is between 90 and 110°.

19. The method as set forth in claim 18, wherein each of the bolt holes in the bolt hole ears defining a bolt hole diameter, and a ratio of the bolt hole diameter to the thickness being between 5.5 and 5.9, the oil passage hole in the first zone having a first zone oil passage hole diameter, and a ratio of the first oil passage hole diameter to the thickness being between 3.1 and 3.5, and the oil passage hole in the fifth zone having a fifth zone oil passage hole diameter, and a ratio of the fifth zone oil passage hole diameter to the thickness being between 2.0 and 2.5.

20. The method as set forth in claim 15, wherein a corresponding line is defined for each of the zones drawn bisecting outermost of the bolt holes in one of the bolt hole ears at outermost extents of each the zones, the lines intersecting to define included angles facing an interior of the seal plate body, the included angle between the sixth and first zones is between 135 and 155°, the included angle between the first and second zones is between 140 and 160°, the included angle between the second and third zones is between 85 and 105°, the included angle between the third and fourth zones is between 105 and 125°, the included angle between the fourth and fifth zones is between 115 and 135°, and the included angle between the fifth and sixth zones is between 90 and 110°.

* * * * *